United States Patent [19]

Plummer

[11] Patent Number: 5,355,757
[45] Date of Patent: Oct. 18, 1994

[54] STRING INSTRUMENT BOWING PRACTICE DEVICE

[76] Inventor: Kathryn C. Plummer, 3416 Benham Ave., Nashville, Tenn. 37215

[21] Appl. No.: 180,981

[22] Filed: Jan. 14, 1994

[51] Int. Cl.⁵ ............................................. G10D 1/02
[52] U.S. Cl. ...................................................... 84/283
[58] Field of Search ........................... 84/282, 283, 325

[56] References Cited

U.S. PATENT DOCUMENTS

| | | | |
|---|---|---|---|
| 1,275,202 | 8/1918 | Becker | 84/282 |
| 3,188,539 | 6/1965 | Baderak | 84/283 |
| 4,554,859 | 11/1985 | Hanly | 84/283 |

*Primary Examiner*—Michael L. Gellner
*Assistant Examiner*—Patrick J. Stanzione

[57] ABSTRACT

A device for practice bowing a stringed musical instrument for the purpose of teaching the movement of a real bow along a path perpendicular to the strings on the string instrument while maintaining a fixed sounding point. The bowing practice device comprises an elongated shaft simulating the ribbon of horsehair on a real bow. This shaft is movably supported in a sleeve which has a groove in the outer surface thereof for receiving a string of a string instrument. The string is held in the groove by two elastic O-rings supported on the sleeve. The movement of the shaft along a path essentially coaxial with the passageway through the string-positioned sleeve provides for movement of the practice device along a path essentially perpendicular to the strings on the string instrument. However, when the shaft is moved along a path departing the aforementioned path a discernable resistance to this movement occurs due to the shaft contacting the walls of the passageway so as to signal the student to reposition the shaft for movement thereof along the proper path.

10 Claims, 1 Drawing Sheet

STRING INSTRUMENT BOWING PRACTICE DEVICE

BACKGROUND OF THE INVENTION

1. Field of the Invention

The present invention relates generally to music training devices and more particularly to a training device used in practicing the bowing of a string instrument such as a violin, viola, or cello.

2. Description of Related Art

A bow used for bowing a stringed musical instruments takes its name in all languages from the fact that it originally was shaped like the bow used in archery. The modern bow for stringed instruments is formed with a long tapered and slightly inwardly curved horsehair-supporting shaft or stick usually made of Pernambuco wood or fiberglass. One end of a flat ribbon formed of a plurality of horsehairs is attached to the distal end or tip of this stick by inserting the end of the ribbon of horsehair in a hole in the stick and fixing it in place with a wood plug. The ribbon of horsehair is then tightly pulled against the spring of the stick (much like an archery bow) and then attached to the other end of the stick by using a sliding component of the bow, commonly known as a frog. The frog is a small, generally rectangularly-shaped block of ebony wood or plastic supported on the underside of the stick near the end of the stick close to the point at which the musician holds the bow. The ribbon of horsehair is passed in an evenly manner through a metal ferrule in the frog and then a screw mechanism at the end of the bow is selectively turned to loosen or tighten the ribbon of horsehair against the spring of the stick.

Stringed musical instruments produce their tone or sound when the ribbon of horsehair on the bow is drawn across the strings of the musical instrument. The ribbon of horsehair on the bow is typically coated with powdered rosin which renders the horsehair tacky or sticky for vibrating the string on the musical instrument and creating a sound or tone as the rosined ribbon of horsehair is selectively drawn across the strings. The sound is best produced on a string instrument by a musician when the latter moves the bow at an angle precisely perpendicular to the strings and when the point of contact or sounding point between the ribbon of horsehair and the strings is essentially one inch from the wooden bridge on the instrument which supports the strings. Bowing along a path that is essentially, and preferably precisely, perpendicular to the strings while maintaining an immoveable or fixed sounding point with respect to the string-supporting bridge on the string instrument are essential elements required for the proper playing of a string instrument. The teaching and learning of this precise movement of the bow along with maintaining a fixed sounding point have been particularly difficult to achieve.

Devices have been previously developed for practice bowing perpendicular to the strings on musical instruments. However, none of these previously developed devices have the capability of teaching the musical student the skill of bowing perpendicular to the strings while simultaneously maintaining an immoveable sounding point. These previously developed practice devices commonly used guide posts of metal or plastic attached to the top of the stringed musical instrument, usually a violin. One such previous practice device utilized a pair of parallel metal, wicket-shaped guide posts that are attached to a violin with plastic fittings. In the use of this device, the player draws a real bow over the strings of the violin along a path located between the metal guides. Another previous practice device required the mounting of a pair of plastic vertical rods on the violin by employing adhesive straps positioned about the body of the violin. Using this practice device, the player draws a real bow over the strings of the instrument between the plastic rods.

The previously known bowing practice devices such as described above each suffer some shortcomings or drawbacks which detract from their use as a bowing practice device. For example, the guide posts and the vertical rods of the above-described practice devices provide too much leeway in allowing the bow to easily deviate from a precise sounding point on the string and also in allowing the bow to excessively fluctuate from a bowing path that is perpendicular to the strings on the musical instrument. These previously known practice devices have also been found to allow string crossing so as to further complicate the intended purpose of these devices. Further, these previously known practice devices are cumbersome to attach to musical instruments and may, in fact, damage a string instrument of value so as to limit their use on relatively inexpensive string instruments.

All previously known bowing practice devices require the use of both the string instrument and a real sound-producing bow and can be attached to violins of standard sizes (full size, ¾ size, ½ size, ¼ size, 1/8 size, 1/16 size) and may be adapted to fit very small violas. However, these previously known practice devices cannot be adequately adjusted to fit a larger standard size viola and the attachment thereof to a cello of any size has been found to be impossible. Another shortcoming with these previously known practice devices is that they can not be readily stored in a standard instrument case for easy transport and accessibility thereof.

SUMMARY OF THE INVENTION

The principal object of the present invention is to provide a bowing practice device that teaches the players of string instruments including violins, violas and cellos of various sizes to move the actual bow used in playing the instrument along a path that is more precisely perpendicular to the strings on instrument while simultaneously maintaining the bow at fixed or immoveable sounding point with respect to the string-supporting bridge on the instrument.

Another object is to make provide a bowing practice device that has an appearance, weight and length substantially similar to a real bow.

Another object of the present invention is to provide such a practice device which can be readily attached to and detached from any size violin, viola and cello and which poses no danger to the fragile construction of expensive wooden string instruments.

A further object is to provide a bowing practice device that can be used with or without a string instrument for practicing the displacement of the bow along a path perpendicular to the strings on the string instrument.

A further object is to provide a bowing practice device that readily fits into the storage case of the string instrument for easy transport and accessibility.

A still further object is to provide a bowing practice device that can be readily sized for use with string instrument of any size including the relatively small ⅛ size, ¼ size, or ½ size instruments as usually used by younger musical students.

The foregoing objects can be accomplished by providing a training or bowing practice device crafted in the basic shape of a full size violin bow. The bowing practice device looks substantially similar to a real bow but differs therefrom in construction, materials and by the fact that the practice device produces no sound. Generally, the device of the present invention for practicing the bowing of a stringed musical instrument comprises: a first elongated shaft means of a substantially uniform cross-sectional dimension over essentially the full length thereof and having first and second end regions; rectangular block means having substantially parallel first and second longitudinally extending edge regions and attached at the first edge region thereof to the first shaft means at the first end region thereof; a second elongated shaft means of a length substantially less than that of the first shaft means attached to the rectangular block means at the second edge region thereof and disposed in a longitudinal plane substantially parallel to and spaced from the longitudinal plane of first shaft means; elongated sleeve means having a elongated passageway therethrough of a substantially uniform cross-sectional dimension slightly larger than the cross-sectional dimension of the first shaft means for receiving therein the first shaft means in a relatively movable manner with respect to the sleeve means over substantially the full length of the first shaft means; and, engagable means supported by the sleeve means and adapted to be engaged for maintaining the sleeve means is a fixed position with respect to the relatively movable first shaft means.

The engagable means supported by the sleeve means are adapted to be engaged by the hand of a musician or, preferably, by a segment of an elongated string on a stringed musical instrument for maintaining the sleeve means in the fixed position with respect to the shaft and in a fixed spacial relationship to the string-supporting bridge on the instrument. Also, the engagable means when engaged with string segment are adapted to position the passageway through the sleeve means and the first shaft means received therein at an angle essentially perpendicular to a segment of an elongated string on the musical instrument. The engagable means comprise groove means in an outer surface region of the sleeve means that are adapted to receive a segment of an elongated string on a stringed musical instrument for maintaining the sleeve means in the fixed position. The engagable means further comprises retaining means for maintaining the string segment in the groove means during the movement of the first shaft means relative to the sleeve means. The second shaft means is disposed in a longitudinal plane that is spaced a preselected vertical distance from the string of the stringed musical instrument when the string is engaged with the engagable means.

Other and further objects of the present invention will become obvious upon an understanding of the illustrative embodiment about to be described or will be indicated in the appended claims, and various advantages not referred to herein will occur to one skilled in the art upon employment of the invention in practice.

A preferred embodiment of the invention has been chosen for the purpose of illustration and description. The preferred embodiment illustrated is not intended to be exhaustive nor to limit the invention to the precise form shown. The preferred embodiment is chosen and described in order to best explain the principles of the invention and their application and practical use to thereby enable others skilled in the art to best utilize the invention in various embodiments and modifications as are best adapted to the particular use contemplated.

DETAILED DESCRIPTION OF THE PRESENT INVENTION

Figure 1:
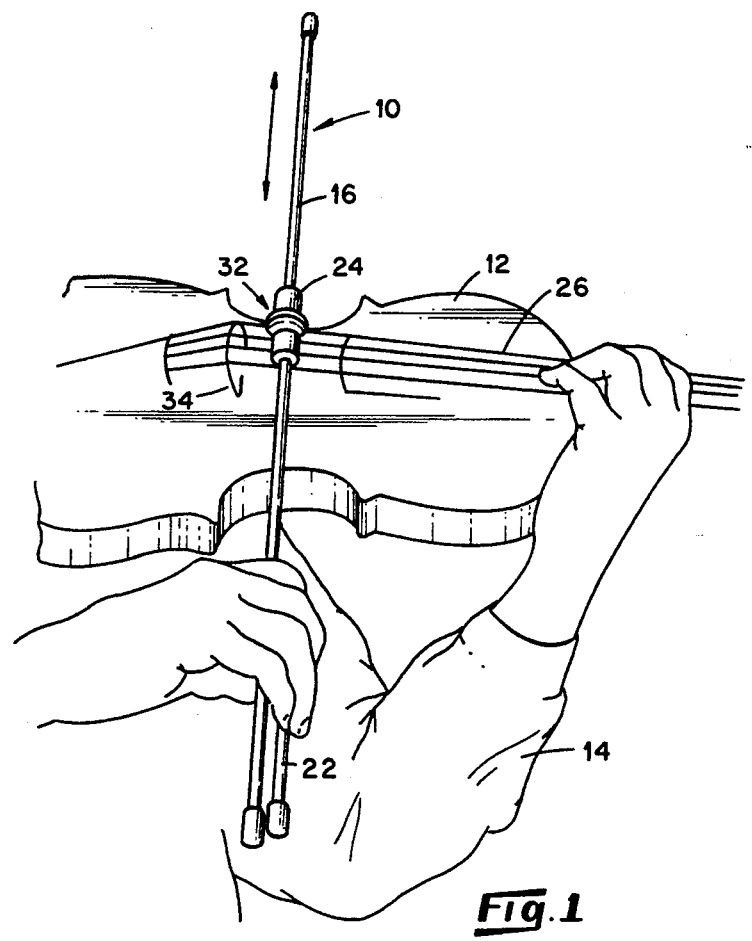
FIG. 1 is a schematic view of the bowing practice device of the present invention being utilized with a stringed musical instrument.
Figure 2:
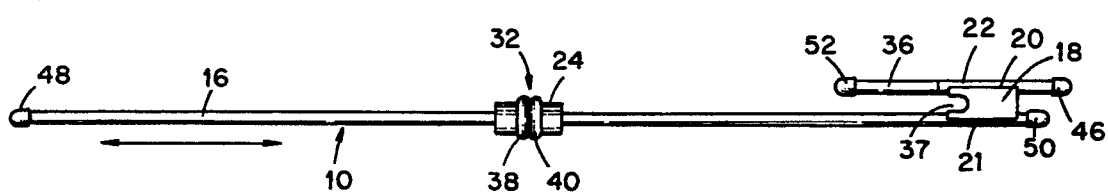
FIG. 2 is a elevational view of the bowing practice device of the present invention.
Figure 3:
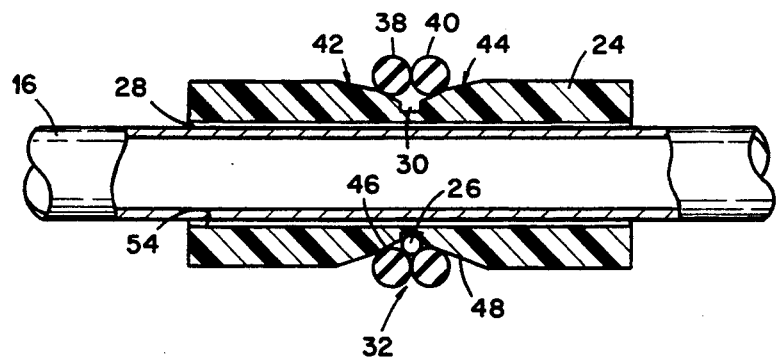
FIG. 3 is an enlarged sectional view showing details the mechanism of bowing practice device used for the attachment thereof to a string on a string instrument for bowing practice purposes.

With reference to FIGS. 1-3 of the accompanying drawing, the bowing practice device 10 of the present invention is shown attached to a string instrument 12 (shown as a violin for the purpose of illustration) for a practice session by a musical student 14. The practice device 10 comprises a relatively long straight slender stick or shaft 16 of essentially a uniform diameter or cross section over substantially the full length thereof. This relatively long shaft 16 simulates the ribbon of horsehair on a real bow. A generally rectangularly-shaped block or frog 18 is attached at one side 20 thereof to the relatively long shaft 16 at one end region thereof. An opposite side 21 of the frog 18 is attached to and supports a relatively short stick or shaft 22 in a longitudinal plane that is spaced from and parallel to the longitudinal plane of the relatively long shaft 16. This relatively short shaft 22 simulates the section of the real bow where one hand of the player grasps the bow.

The practice device 10 includes a substantially tubular or hollow cylindrically-shaped component or sleeve 24 that is attachable to any of the bridge-supported strings 26 of a string instrument such as shown at 12 and in which the long shaft 16 is movably supported. The sleeve 24 is provided with a longitudinally extending and thoroughgoing passageway 28 of a diameter just slightly greater, e.g., about 0.001 to 0.010 inch greater, than the outer diameter or the cross-sectional dimension of the relatively long shaft 16. The outer surface of the sleeve 24 at a location intermediate the opposite ends thereof is provided with an annular circumferentially extending and outwardly facing notch or groove 30 that is concentric with the passageway 28. This groove 30 is of a depth and width sufficient to receive at least a portion of a section or segment of a string 26 of the musical instrument 12. Thus, when a longitudinal segment of any string 26 of the musical instrument 12 engages the groove 30 opposite sides of the string 26 will contact opposite edges or sides of the groove 30 so as to assure that the string 26 is positioned perpendicularly to both the longitudinal axis of the sleeve 24 and the shaft 16 movably supported therein. Retaining means 32, as will be described below, are supported by the sleeve 24 at a location adjacent to the groove 30 for continuously urging the segment of the string 26 into the groove 30 and for releasably retaining the segment of the string 26 in the groove 30 at an angle essentially perpendicular, preferably exactly perpendicular, to the longitudinal axis of the shaft 16 and parallel to the bridge 34 on the string instrument 12 used for supporting the strings 26. The attachment of the sleeve 24 to the string 26 is at a location thereon that is spaced a preselected distance from the bridge 34 so as to provide a fixed or immovable sounding point for the practice device 10.

As briefly described above, the bowing practice device 10 is preferably of essentially the same dimension and weight as a real bow. Also, the shaft 16 must have sufficient structural integrity to resist bending during a practice session. Thus, in order to provide these desired weight and structural features, the shaft 16 is preferably formed of a light-weight and high-strength material such as aluminum or other light weight metal in the form of tubing. Alternatively, the shaft 16 can be satisfactorily formed from tubes of high strength plastics or composites incorporating carbon or graphite fibers. The shaft 16 could be formed of wood but the expense thereof and the possibility of warping problems detract from the use of this construction material.

The shorter stick or shaft 22 can be readily formed of the same materials as the longer shaft 16 or be formed of wood or any other suitable material. It is not necessary to have the shaft 22 of the same length as the frog-supporting end of a real bow since the length of this shaft 22 needs to be only great enough to enable the hand of the student to properly grasp the shaft 22 above the frog 18. The shaft 16 and the shaft 22 can be of any suitable cross-sectional shape such as oval, rectangular, or circular, preferably the latter. The shafts 16 and 22 can be of the same or different shapes.

In a preferred embodiment of the present invention, the shafts 16 and 22 are formed of anodized aluminum tubes having a uniform outer diameter of 0.375 inch. The shorter aluminum shaft 22 is 6 inches in length for use with all practice devices corresponding to all sizes of bows ranging from full size down to ⅛ size. The shaft 22 simulates the wood stick of a real bow that is disposed in a plane parallel to the ribbon of horsehair. Since the surface of aluminum tubing is usually relatively slick as compared to wood, the hand-contacting surface region of the shaft 22 is preferably embossed or covered with a relatively rough or non-slick material such as provided by a length of commercially available heat shrink tubing as generally shown at 36. The longer aluminum shaft 16 simulates the ribbon of horsehair on a real bow and is cut to any of several lengths, each of which corresponds to the an actual length of a real bow. These various lengths of shaft 16 can correspond to the length of any of a full size bow, a ¾ bow, a ½ size bow, a ¼ size bow, or the ⅛ size bow, which are respectively, 27.875 inches, 25.625 inches, 23.125 inches, 20 inches, and 17.875 inches, in length. The bowing practice devices 10 of these various lengths are preferably rendered identifiable by using appropriate colors or other identifying indicia.

The rectangularly shaped block or frog 18 can be formed of any suitable material such as wood, metal or plastic. The frog 18 is preferably formed of a relatively rigid polymeric material such as polystyrene, polyethylene, and the like, and is shaped into a desired configuration in any suitable manner such as by molding or machining. Typically, the frog 18 will be of a length, width and height of about 1.625 inches, 0.375 inch, and 0.9375 inch, respectively. The shafts 16 and 22 can be attached to the frog 18 in any suitable manner such as by using a mechanical fit, an adhesive, bolts or screws, or welding. In attaching the shafts 16 and 22 to the frog 18, these shafts are positioned in spaced apart longitudinal parallel planes so that the longitudinal axis of the short shaft 22, which simulates the handle of a real bow, will be spaced essentially one inch from the segment of the string 26 in the groove 30 so as to correspond to the vertical spacing of the bow handle from the ribbon of horsehair on a real bow. Preferably, the shafts 16 and 22 are attached to the frog 18 by providing the bottom edge region 20 and the top edge region 21 of the frog 18 with lengthwise U-shaped grooves (not shown) that are of a diameter essentially the same or slightly smaller than the cross-sectional dimension or outside diameter of the shafts 16 and 22 so that these shafts can be "snapped" into these U-shaped grooves to secure the shafts to the frog 18. The frog 18 is preferably provided with a generally U-shaped recess or relief 37 in an edge region interconnecting the top and bottom edge regions 21 and 20 and facing the sleeve 24 so as to more closely resemble a frog on a real bow. All edges of the frog 18 are smoothly filed to eliminate sharp surfaces which might scratch the hands of the player.

The sleeve 24 that is fixed to the string 26 of a string instrument such as shown at 12 can be formed of any suitable material such as wood, plastic, or metal and be of any suitable configuration such as oval, round or rectangular. The sleeve 24 can be of a length in the range of about 1 to 2 inches, preferably about 1.5 inches, and of a diameter or cross section in the range of about 0.5 to 0.75 inch, preferably about 0.625 inch. The passageway 28 through the sleeve 24 is of a configuration corresponding to that of the shaft 16 and is of a diameter or cross section slightly larger than that of the shaft 16 so as to provide for relatively unimpeded movement of the shaft 16 through the sleeve 24 when the shaft 16 is coaxially aligned with the passageway 28 but providing an increasing level of resistance to such movement as the longitudinal axis of the shaft 16 is increasingly moved at angles departing from the coaxial alignment with the passageway 28. A difference of about 0.001 to about 0.010 inch between the cross section or outer diameter of the shaft 16 and the cross section or diameter of the passageway 28 is sufficient to provide this feature of the present invention.

The radially outwardly open annular or circumferentially extending groove 30 in the outer surface of the sleeve 24 is of a generally rectangular configuration so as to at least partially receive in a contacting relationship therewith cross-sectional portions of strings 26 of various diameters. This string receiving goal can be satisfactorily achieved by employing a groove 30 of a depth and width in the range of about 0.0625 to about 0.09375 inch. As briefly described above the segment of the string 26 is retained in the groove 30 by the retaining means 32. The string retaining means 32 can be of any suitable construction which is capable of retaining the string 26 in the groove 30 at a right angle to the passageway 28 through the sleeve 24. Preferably, the string retaining means 34 is provided by two O-rings 38 and 40 formed of rubber or a suitable elastomeric material. These O-rings 38 and 40 are placed about the outer surface of the sleeve 24 in a side-by-side, abutting relationship with one O-ring located on each side of the groove 30 and with the interface between the abutting O-rings 38 and 40 generally overlying the center of the groove 30. With these O-rings so positioned on the sleeve 24, the segment of the string 26 can be passed, with a slight effort, between the O-ring 38 and 40 and into, or at least partially into, the groove 30. The O-rings 38 and 40 will then bear against the segment of the string 26 engaging the groove 30 to continuously urge the string 26 towards and into the groove 30. In order to assure that O-rings 38 and 40 provide this function and are maintained in a side-by side relationship over the groove 30, the outer surface of the sleeve 24 on each side of the groove 30 is provided with shelf regions 42 and 44 that are inwardly inclined towards the groove 30. These inwardly slanted shelf regions 42 and 44 continuously urge the O-rings 38 and 40 towards one another and into position with respect to the groove 30. Satisfactory results can be achieved by slanting the shelf regions 42 and 44 at an angle in the range of about 5° to 30° with respect to the longitudinal axis of the sleeve 24.

If desired, the shelf regions 42 and 44 may be provided with sections 46 and 48 inclined at different angles with respect to the longitudinal axis of the sleeve 24. The shelf section 46 underlying the O-rings 38 and 40 and communicating with the groove 30 can be inclined at an angle of about 3° to 15° greater than the other shelf section 48 so at to assure that the O-rings are maintained in an abutting relationship over the groove 30. The O-rings 38 and 40 by be of any suitable configuration so as to correspond to the configuration of the sleeve 24. Also, these O-rings are preferably have a cross section of a sufficient size so as to assure that the O-rings continually contact and press against the segment of the string 26 for urging it towards the center of the groove 30.

The exposed ends of the shafts 16 and 22 are covered with end caps 46, 48, 50 and 52 formed of a suitable material such as rubber or an elastomer. These end caps protect the player and the string instrument from exposure to the sharp ends of the shafts 16 and 22. The end cap 46 also retains the tubular component or sleeve 24 on the shaft 16.

Bowing perpendicular to the string 26 while maintaining an immoveable sounding point on the string 26 is a complicated process for the right upper arm, forearm, wrist, hand and fingers of a musical student. A common complaint of such students is that the shoulder continues to move the upper arm when the elbow should take over by moving the forearm. This error in bowing results in the bow moving across the string in an arc. The bowing practice device 10 of the present invention is an aid for teaching the musical students how to achieve proper bow movement.

In a typical application of the bowing practice device 10, the sleeve 24 supported on the relatively long shaft 16 is attached to a the segment of the string 26 of the string instrument 12 such as a violin, viola, or cello by positioning a segment of the selected string 26 between the O-rings 38 and 40 and then gently pressing the sleeve 24 down onto the string 26 to move the segment of the string 26 between the O-rings 38 and 40 and into contact with the groove 30. The bias provided by the O-rings 38 and the dimensions of the groove 30 underlying the O-rings function together to secure the bowing practice device 10 to the string instrument in a relatively secure manner so that the sounding point on the string cannot be easily moved. With the string 26 so engaged by the sleeve 24, the player holds the bowing practice device 10 in the same manner one holds a real bow. As shown in FIG. 1, the thumb of the right hand of the player serves as a fulcrum for the fingers of the right hand when holding the device 10. The thumb presses in a direction generally upwards toward to the attached top shaft 22 and is positioned and next to the inner side of the rectangular frog 18 while the fingers of the right hand drape down over the top of the shaft 22 onto the outer side of the frog 18. The player can then move the shaft 16 back and forth within the fixed sleeve 24 over substantially the full length of the shaft 16 ranging from a location at the end region of the shaft 16 supporting the frog 18 to location an end of the shaft 16 remote to the frog 18 all the while maintaining an immoveable sounding point on the string 26.

As long as the player moves the shaft 16 along a preferred path that is essentially parallel to the string-supporting bridge 34 or perpendicular to the longitudinal axis of the strings 26 and essentially coaxial with the passageway 28 through the sleeve 24, the shaft 16 can be moved with a smooth gliding motion. However, when the player positions the shaft 16 at an angle that slightly departs from the preferred path, the sleeve 24 will still be maintained in the preferred orientation by the string 26 so as to cause the walls 54 of the passageway 30 to bear against the outer surface of the shaft 16 and thereby induce an easily discernable resistance to the reciprocating movement of the shaft 16 in the sleeve 24. This resistance to the movement of the shaft 16 increases with increasing deviations in the angle the shaft 16 is moved from the preferred path. When the player discerns an increase in resistance to the movement of the shaft 16, the player can easily reposition the shaft 16 for movement along the preferred path by sensing the changes in the resistance to the movement of the shaft 16, If the path of the shaft 16 considerably departs from the preferred path the sleeve 24 will disengage from the string 26 before any damage can occur to the string instrument. In fact, a relatively large displacement of the shaft 16 from the preferred path provides for releasing the bowing practice device 10 from the string 26 when the practice session is completed.

While the present invention is described herein as being attached to a string instrument for practice bowing, it will appear clear that a player who wishes to practice bowing without attaching the device 10 to a string instrument can usefully practice bowing with the device 10 by supporting the sleeve 24 in one hand while grasping the frog 18 and moving the shaft 16 back and forth through the sleeve 24. With this technique, the same principles apply as if the device 10 was attached to a string instrument so that the arm of the player is correctly guided. Also, the bowing practice device 10 can easily be adapted to correspond to smaller size bows by reducing the length of the shaft 16 while maintaining all other parts of the same size. Since bow lengths for full sized violin, viola and cello sizes vary less than about 1 inch, the device 10 can be effectively used by all violinists, violists and cellists.

It will be seen that the bowing practice device of the present invention fulfills the primary objective of the present invention in that it is particularly suitable for teaching a violinist, violist or cellist how to bow along a path that is more precisely perpendicular to the strings of the instrument and how to maintain an immoveable sounding point while so bowing. Furthermore, the bowing practice device is relatively easy to attach to any string of a string instrument and poses no danger to string instrument. Also, the bowing practice device looks very much like a real bow and is of similar length and weight and can easily stored in a string instrument case for transport and accessibility.

The foregoing description of the preferred embodiment of the invention has been presented for the purposes of illustration and description. This description is not intended to be exhaustive or to limit the invention to the precise form disclosed since many modifications and variations of the subject bowing practice device are possible in light of the above teaching. Thus, it is intended that the scope of the invention be limited not by this detailed description, but rather by the claims appended hereto.

What is claimed is:

1. A device for practicing bowing of a stringed musical instrument, comprising a first elongated shaft means of a substantially uniform cross-sectional dimension over essentially the full length thereof and having first and second end regions, rectangular block means having substantially parallel first and second longitudinally extending edge regions and attached at the first edge region thereof to the first shaft means at the first end region thereof, a second elongated shaft means of a length substantially less than that of said first shaft means attached to the rectangular block means at the second edge region thereof and disposed in a longitudinal plane substantially parallel to and spaced from said first shaft means, elongated sleeve means having a elongated passageway therethrough of a substantially uniform cross sectional dimension slightly larger than the cross sectional dimension of said first shaft means for receiving therein said first shaft means in a relatively movable manner with respect to said sleeve means over substantially the full length of said first shaft means, and engagable means supported by said sleeve means and adapted to be engaged for maintaining the sleeve means n a fixed position with respect to the relatively movable first shaft means.

2. A device for practicing bowing of a stringed musical instrument as claimed in claim 1, wherein the engagable means are adapted to be engaged by a segment of an elongated string on a stringed musical instrument for maintaining said sleeve means in the fixed position, wherein the fixed position of the sleeve means includes maintaining the sleeve means at an angle essentially perpendicular to the elongated string, and wherein the engagable means when engaged with a segment of an elongated string on a stringed musical instrument are adapted to position the sleeve means at a selected location on the elongated string for providing a fixed sounding point.

3. A device for practicing bowing of a stringed musical instrument as claimed in claim 2, wherein the second shaft means is disposed in a longitudinal plane spaced by said block means and said sleeve means a preselected distance from an elongated string on a stringed musical instrument when engaged with the engagable means.

4. A device for practicing bowing of a stringed musical instrument as claimed in claim 2, wherein the engagable means include groove means in an outer surface region of the sleeve means, wherein the groove means are adapted to receive a segment of an elongated string on a stringed musical instrument for maintaining said sleeve means in the fixed position, and wherein the engagable means further includes retaining means for maintaining a segment of an elongated string of a stringed musical instrument in said groove means.

5. A device for practicing bowing of a stringed musical instrument as claimed in claim 4, wherein said first shaft means is of a tubular configuration over substantially the full length thereof, wherein the sleeve means is an elongated tube, wherein the groove means circumferentially extend about the elongated tube in a plane perpendicular to the longitudinal plane of the first shaft means, and wherein the retaining means comprise first and second O-rings of elastic material disposed about an outer surface region of the tube in a side-by-side and abutting relationship with the resulting interface between the O-rings substantially overlying said groove means.

6. A device for practicing bowing of a stringed musical instrument as claimed in claim 5, wherein the outer surface region of the elongated tube includes inwardly tapered surface regions on opposite sides of and communicating with said groove means and underlying said first and second O-rings for urging said first and second O-rings into said abutting relationship.

7. A device for practicing bowing of a stringed musical instrument as claimed in claim 5, wherein the first shaft means comprises a tube of sufficient rigidity to longitudinally extend in substantially a single longitudinal plane.

8. A device for practicing bowing of a stringed musical instrument as claimed in claim 7, where the second shaft means comprises a second tube, wherein groove means are in the first and second edge regions of the rectangular block means for respectively receiving a portion of the tube providing the first shaft means and a portion of the second tube providing the second shaft means, wherein the portion of the second tube received in the groove means in the second edge region of the rectangular block means is intermediate opposite end regions thereof, and wherein the rectangular block means has a substantially U-shaped third edge region extending between the first and second shaft means and facing said sleeve means.

9. A device for practicing bowing of a stringed musical instrument as claimed in claim 1, wherein the cross-sectional dimension of the passageway in the sleeve means is sufficiently larger than that of the first shaft means to provide for substantially unimpeded movement thereof through said passageway along a path substantially coaxial with the passageway, and wherein the cross-sectional dimension of the passageway is sufficiently close to that of the first shaft mean so as to impede the movement thereof through the passageway along a path apart from the substantially coaxial path.

10. A device for practicing bowing of a stringed musical instrument as claimed in claim 9, wherein the cross-sectional dimension of the passageway is about 0.001–0.010 inch larger than the cross sectional dimension of the first shaft means.

* * * * *